J. F. HILL.
RUNNING GEAR FOR VEHICLES.
APPLICATION FILED OCT. 13, 1917.
1,297,166.
Patented Mar. 11, 1919.
2 SHEETS—SHEET 1.
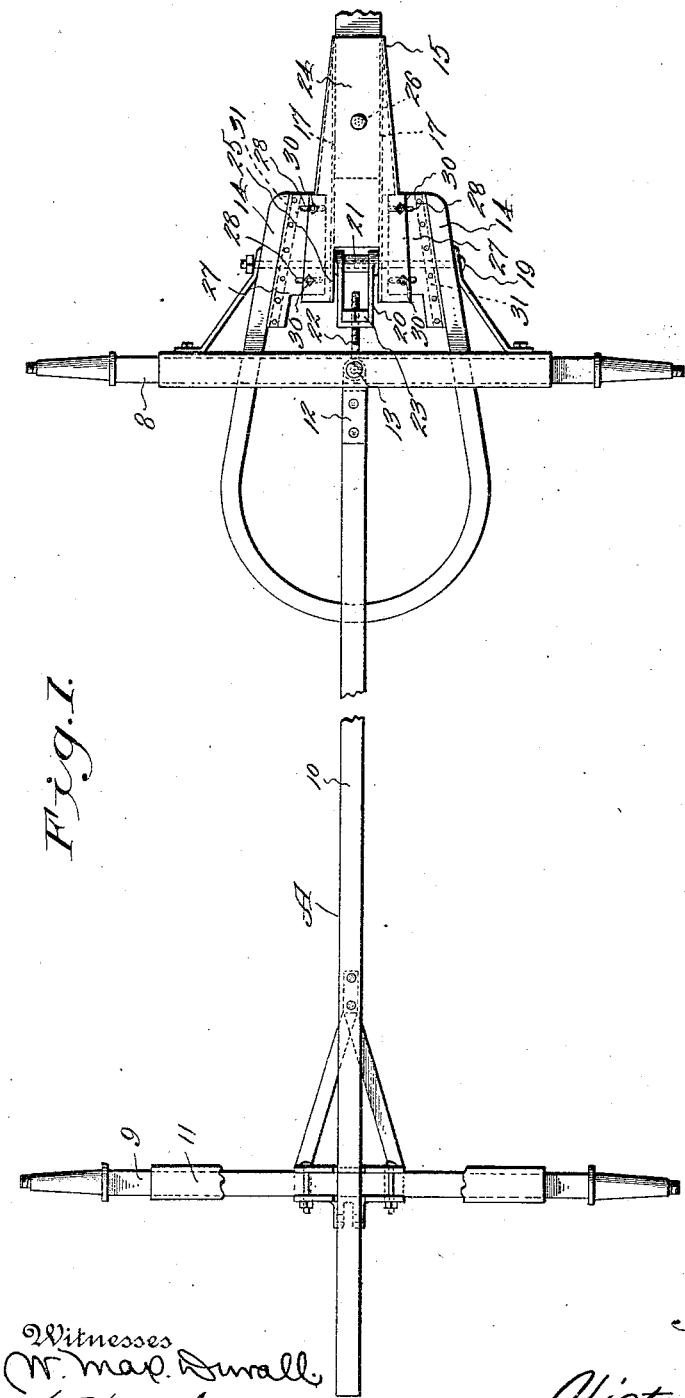
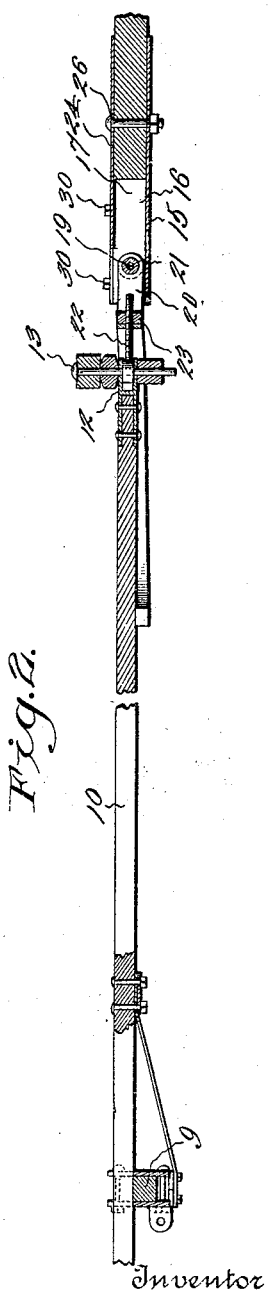
Witnesses
Inventor
J. F. Hill,
By Victor J. Evans
Attorney J. F. HILL.
RUNNING GEAR FOR VEHICLES.
APPLICATION FILED OCT. 13, 1917.
1,297,166.
Patented Mar. 11, 1919.
2 SHEETS—SHEET 2.
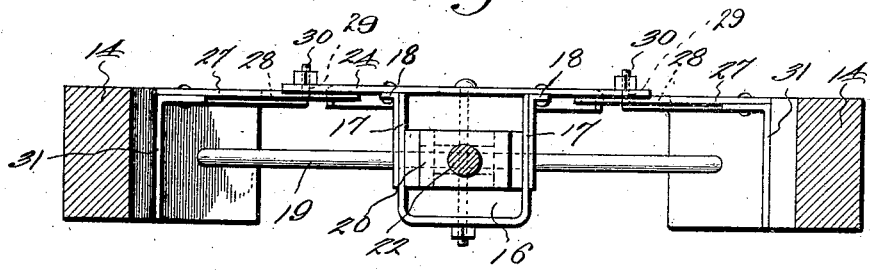
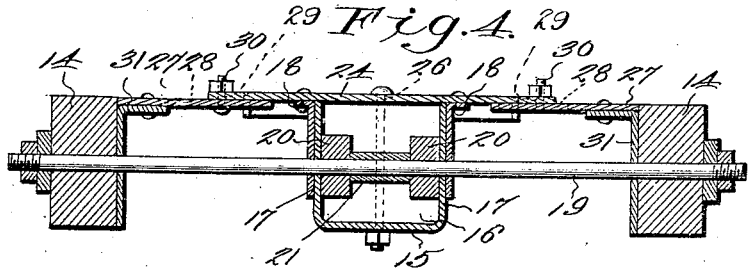

UNITED STATES PATENT OFFICE.

JAMES F. HILL, OF BILLINGS, MONTANA.

RUNNING-GEAR FOR VEHICLES.

1,297,166.  Specification of Letters Patent.  Patented Mar. 11, 1919.

Application filed October 13, 1917. Serial No. 196,451.

*To all whom it may concern:*

Be it known that I, JAMES F. HILL, a citizen of the United States, residing at Billings, in the county of Yellowstone and State of Montana, have invented new and useful Improvements in Running-Gears for Vehicles, of which the following is a specification.

This invention relates to improvements in running gears for vehicles of the type employed upon farms and the like.

The primary object of the invention is to provide attachments for the running gears of vehicles of this character which will not only enable the tongue of the vehicle to be quickly and easily removed for the storing of the vehicle, but will also enable several vehicles to be connected and used in connection with each other without imposing undue strain upon the front axles of the vehicles and the hounds associated therewith.

Another object of the invention is to provide a holder for the tongue of the vehicle which may be formed of sheet metal and is so constructed that it may not only be connected with the various types of hounds now in use but enables the wagon tongue to be quickly removed therefrom when the occasion requires.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications within the scope of the claims may be resorted to when desired.

In the drawings:—

Figure 1 is a top plan view of the running gear for a vehicle to which attachments constructed in accordance with the invention are shown applied.

Fig. 2 is a longitudinal section through Fig. 1.

Fig. 3 is an enlarged section through the connection between the wagon tongue and front axle.

Fig. 4 is a transverse section therethrough.

Like characters of reference denote corresponding parts throughout the several views in the drawings.

Referring now to the drawings in detail the letter A designates a running gear of a farm wagon to which attachments constructed in accordance with the invention are shown applied. The running gear A includes a front axle 8 and a rear axle 9 which are connected by a reach 10. The reach 10 is connected with the rear axle 9 and bolster 11 thereon in the usual manner and has its forward end provided with a slotted head 12 which rests upon the front axle 8 and has passed through a suitable opening therein the king bolt 13 which secures the front bolster and sand board to the axle 8.

Mounted upon the front axle 8 and passing beneath the reach 10 in the usual manner are hounds 14 between which in advance of the axle 8 is arranged a tongue holder 15.

The tongue holder 15 is preferably constructed of sheet metal and includes an open ended trough-like body 16 the sides 17 of which extend beyond the bottom at one end of the body. Secured to the side 17 of the body 16 are angle irons 18 through which and extending portions of the sides 17 passes a rod 19 mounted in suitable openings in the hounds 14. The rod 19 also passes through the arms of the yoke 20 which are arranged between the extending portions of the sides 17 of the body 16, and have arranged therebetween a sleeve 21 upon the rod 19. A bolt 22 has its threaded shank passed through a suitable opening in the cross piece of the yoke 20 and engaged with a nut 23 arranged between the arms of the yoke 20. The head of the bolt 22 is flattened and arranged within the slot in the head 12 and has formed therein an opening through which the king pin 13 is passed. The yoke 20 and bolt 22 provide an adjustable coupling between the tongue holder 15 and the axle 8.

A substantially triangular shaped plate 24 is bolted to the angle irons 18 to close the open top of the trough like body 16 and has formed in its base a rectangular shaped recess 25 which permits the yoke 20 to be swung to a vertical position when the bolt 23 has been released from engagement with the king pin 13. The plate 24 extends beyond the sides of the trough-like body for the greater portion of their length and has formed therein an opening 26 in line with an opening in the trough like body to permit a pin to be employed to retain a vehicle tongue connected with the holder 15.

Interposed between the hound 14 and the trough-like body 16 are plates 27 which extend beneath a projecting portion of the plate 24 and have formed therein slots 28 in line with openings 29 in the plate 24, to permit bolts 30 to be employed for retaining the plates 27 in adjusted position upon the plate 24. Secured to the under face of the supplemental plates 27 are angle irons 31 which are adapted to contact with the hounds 14 and have passed therethrough the rod 19.

From the above described manner of constructing and connecting the tongue holder 15 with the running gear of the vehicle it is apparent that the tongue holder may be used in connection with hounds of different types and that a vehicle tongue may be quickly connected with or removed from the tongue holder when the occasion requires.

From the foregoing description taken in connection with the accompanying drawings it is apparent that attachments for the running gear of farm wagons has been provided which though inexpensive of manufacture are highly efficient for the purposes stated.

Having thus described the invention, what is claimed as new, is:—

1. In a running gear attachment, an open ended tongue holder, a rod upon which said tongue holder is mounted, a yoke swingingly connected with said rod and a bolt adjustably secured to said yoke and adapted to be engaged by the king bolt.

2. In a running gear attachment, a fulcrum rod, an open ended trough like body through which said rod is passed, an adjustable coupling swingingly connected with said rod in line with said trough like body, and a cover plate connected with said body extending beyond the sides thereof.

3. In a running gear attachment, an open ended trough like body, a rod upon which said body is mounted extending beyond the sides thereof, a plate closing the top of said body extending beyond the sides of the body, and other plates adjustably connected with the first-mentioned plate.

4. The combination with the hounds in the running gear of a vehicle, of an open ended trough like body interposed between said hounds and extending beyond the forward ends thereof, a plate on said body extending beyond the sides thereof for a greater portion of their length, supplemental plates interposed between said hounds and the trough like body having slots therein, bolts passing through said slots and the first mentioned plate, angle irons on the supplemental plates, and a rod passing through said trough like body, the angle irons and hounds.

In testimony whereof I affix my signature.

JAMES F. HILL.

Copies of this patent may be obtained for five cents each, by addressing the "Commissioner of Patents, Washington, D. C."